United States Patent [19]
Meyer et al.

[11] Patent Number: 5,950,450
[45] Date of Patent: Sep. 14, 1999

[54] CONTAINMENT SYSTEM FOR TRANSPORTING AND STORING TEMPERATURE-SENSITIVE MATERIALS

[75] Inventors: Byron Keith Meyer; Chris E. Meyer, both of Xenia; Nicholas Wynne, Franklin; Robert E. Bailey, Columbus; Ival O. Salyer, Dayton, all of Ohio

[73] Assignee: Vacupanel, Inc., Xenia, Ohio

[21] Appl. No.: 08/662,784

[22] Filed: Jun. 12, 1996

[51] Int. Cl.⁶ .............................. F25B 27/00; F25B 21/00
[52] U.S. Cl. .......................... 62/457.9; 62/235.1; 62/236
[58] Field of Search .................. 62/371, 457.9, 62/457.7, 235.1, 238.1, 236, 457.1, 457.2; 252/67

[56] References Cited

U.S. PATENT DOCUMENTS

| | | | |
|---|---|---|---|
| 4,162,341 | 7/1979 | Norton | 428/117 |
| 4,632,645 | 12/1986 | Kawakami et al. | 417/417 |
| 4,706,470 | 11/1987 | Akazawa et al. | 62/209 |
| 4,726,974 | 2/1988 | Nowobilski et al. | 428/69 |
| 4,821,914 | 4/1989 | Owen et al. | 220/421 |
| 5,035,122 | 7/1991 | Oogjen | 62/457.2 |
| 5,082,335 | 1/1992 | Cur et al. | 312/401 |
| 5,106,520 | 4/1992 | Salyer | 252/70 |
| 5,252,408 | 10/1993 | Bridges et al. | 428/621 |
| 5,282,994 | 2/1994 | Salyer | 252/70 |
| 5,379,596 | 1/1995 | Grayson | 62/362 |
| 5,505,046 | 4/1996 | Nelson et al. | 62/3.6 |
| 5,512,345 | 4/1996 | Tsutsumi et al. | 428/69 |
| 5,522,216 | 6/1996 | Park et al. | 62/3.6 |

FOREIGN PATENT DOCUMENTS 2232756  12/1990  United Kingdom .

OTHER PUBLICATIONS

VAXICOOL Transport and Storage Refrigerator, VacuPanel, Inc. (1993) brochure.

*Primary Examiner*—William Doerrler
*Attorney, Agent, or Firm*—Thompson Hine & Flory LLP

[57] ABSTRACT

A portable, self-sustaining refrigeration system for storing and transporting temperature sensitive materials comprising an insulated housing constructed of double wall plastic panels having an R value per inch of at least 20, and a thermal storage phase change material in the form of a reversible gel for operation at about 0° to 10° C. wherein the reversible gel is enclosed in a sealed liquid-impervious enclosure, is disclosed.

31 Claims, 2 Drawing Sheets

MELTING POINT VS. CARBON CHAIN LENGTH OF STRAIGHT CHAIN ALKYL HYDROCARBONS, DETERMINED BY DIFFERENTIAL SCANNING CALORIMETRY, AT 2° C/MIN. RATE OF HEATING AND COOLING

CONTAINMENT SYSTEM FOR TRANSPORTING AND STORING TEMPERATURE-SENSITIVE MATERIALS

BACKGROUND OF THE INVENTION

This invention relates to containers useful for the transport and storage of temperature-sensitive materials such as vaccines, antibodies, etc., for long periods of time in locations which lack conventional sources of electrical power.

In many developing countries, particularly in tropical and desert climates, there is a lack of sufficient refrigeration systems and, in many instances, there are no power capabilities to operate such refrigeration systems even if they were available.

The prior art systems available are based on refrigerator systems that freeze water to provide thermal storage temperatures of 0° C. or below. Exposure of temperature-sensitive medicinals such as vaccines, etc., to these low temperatures frequently results in irreversible damage due to freezing of water which is an essential component to many of these medicinal products. On the other hand, storage of the medicinals at temperatures greater than about 10° C. can also cause irreversible damage to the medicinals. Thus, there is an urgent need for a portable refrigerator system that operates to maintain the temperature within a narrow band above 0° C. and below 10° C. and which can operate where conventional electrical power lines are not available.

SUMMARY OF THE INVENTION

In accordance with the present invention, a number of integrated interconnected units form a self-sustaining refrigeration and transport system which can store temperature-sensitive materials in the desired temperature plateau, just above the freezing point of water, for long periods of time. This system satisfies an urgent need of the World Health Organization for preservation, storage, and transport of medicinals that is especially valuable in tropical and desert climates in developing countries, where the absence of such capabilities often results in deterioration of the medicinals to the extent that they cannot provide the expected treatment. In vaccines, this may result in vaccinations that are ineffective, or, in some cases, actually harmful when used.

The storing and transporting system of the present invention comprises:

(1) a source of electric power;
(2) a battery for storing the electrical energy from the power source;
(3) a refrigeration unit comprising a compressor system;
(4) a closable container or housing for the refrigerator/compressor unit which provides a low rate of heat transfer.
(5) a contained thermal storage phase change material (PCM) which provides a plateau of constant temperature at a temperature of about 0° to 10° C., preferably about 5° C., and having a thermal storage capacity of at least about 20 calories/gram; and
(6) a highly insulated portable container to hold a quantity of the phase change material together with a temperature sensitive payload.

DETAILED DESCRIPTION OF THE INVENTION

The present invention relates to a unique combination of integrated elements which provide a new and economical container system which can be used as a stand-alone unit for use in remote areas for the safe preservation and transportation of medicinals, such as vaccines, antibodies, etc., for the World Health Organization worldwide. The container system of this invention is particularly useful in tropical and desert developing countries in Africa and elsewhere where electrical power lines may not be available.

In a particularly preferred aspect of the invention, the container system of the present invention includes:

(1) an energy source for supplying direct current (DC) power to the system;
(2) a battery for storing the direct current electrical power and supplying continuous DC power to the unit whether the energy source is operating or not;
(3) a refrigerator/compressor unit for cooling the container system;
(4) a closable refrigerator housing comprising evacuated, double wall plastic panels which provide a low rate of heat transfer;
(5) a contained-phase change material which supplies a plateau of constant temperature at about 5° C.; and
(6) a highly insulated portable container to hold a quantity of the phase change material together with a temperature sensitive payload, e.g. medicinals, to transport that payload to remote locations within the required time.

Figure 1:
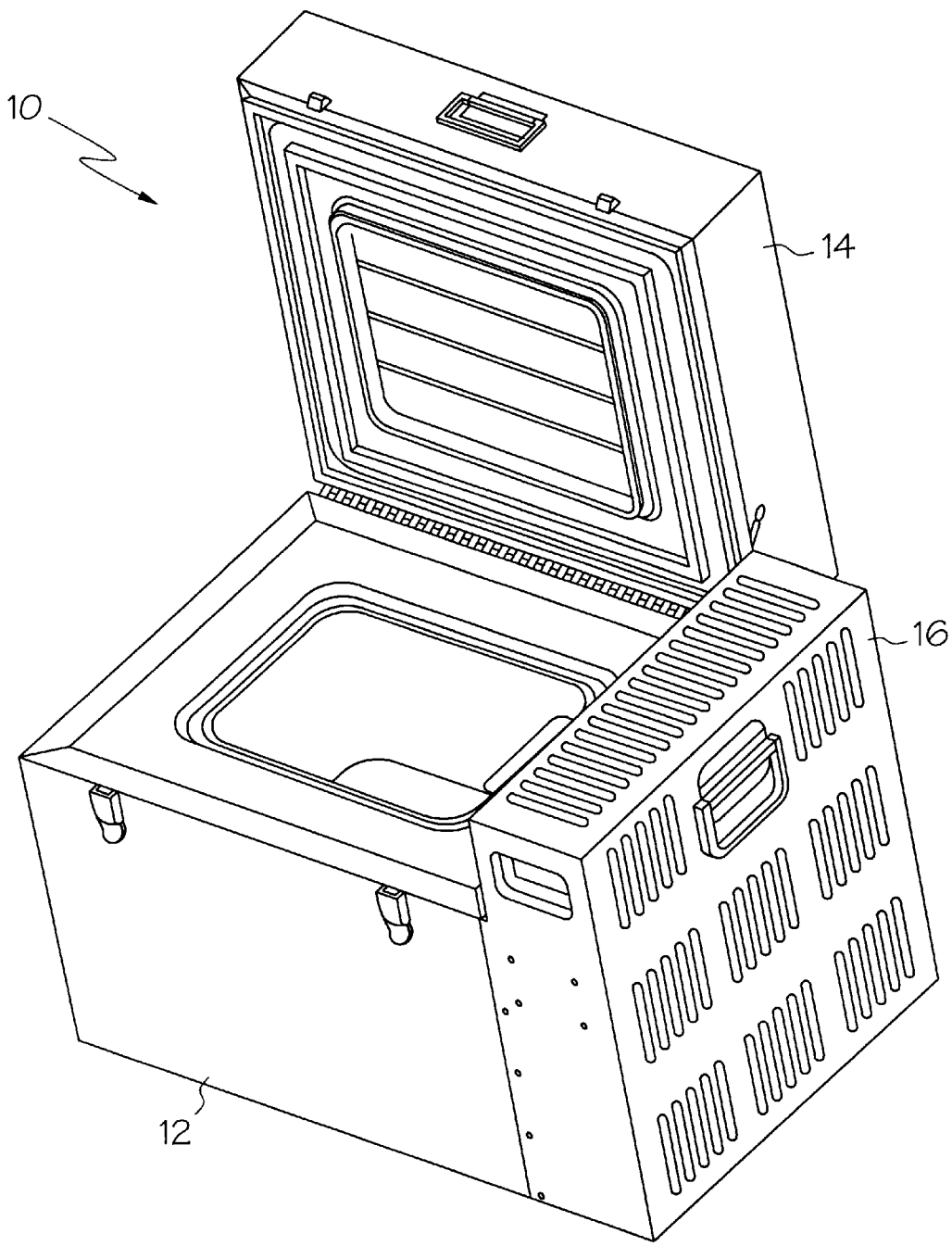
FIG. 1 is a perspective view of the self-contained container of the present invention.

As illustrated in FIG. 1, the integrated container system 10 consists of a housing 12 including a lid assembly 14. A refrigeration unit 16 is provided as an integral part of the container system 10. The refrigerator unit 16 includes a compressor unit (not shown) which employs a compressible vapor component which is preferably chlorine-free, such as a chlorine-free hydrofluorocarbon, as the refrigerant. Typically, the vapor compressor unit is a swing motor, an electro-dynamic reciprocating device that directly drives the piston of the compressor and normally requires only about 3.5 amperes of current at 12 volts to operate. The internal evaporator of the refrigeration unit absorbs heat from the space inside the insulated container for the refrigerator compressor and stores a significant amount of this heat in the phase change material, which then provides a narrow temperature band width centered at about 3° C. for long periods of time when the compressor unit is not operating. Additionally the frozen phase change material can be removed from the refrigerator container unit and placed in a separate vacuum panel insulated container and used to maintain a constant temperature of about 5° C. for a long period of time during transport of a temperature sensitive payload.

The need for excessively large and expensive generators is avoided by the use of a low power vapor compressor refrigeration unit, which requires only about 3.5 amperes at 12-volts to operate. This small amount of energy can be sufficient to supply the refrigeration requirement of the system only if the refrigerator unit is highly insulated so that heat loss to the surroundings is minimized. This is made possible by the use of a refrigeration unit comprising evacuated, double wall plastic panels.

The complete system comprising a combination of the afore-mentioned integrated elements effectively supplies the need for a reliable, low-cost, stand-alone refrigeration and transport system that can supply a constant temperature of about 5° C. for extended periods of time to fill the requirements of the World Health Organization for safe storage and transport of medicinals in developing countries of the world.

Many materials undergo a change in their physical form, or state, from a solid-to-liquid and liquid-to-gas, as the temperature is progressively increased from absolute zero. During the phase change from solid-to-liquid and liquid-to-gas, heat is absorbed from the surrounding environment. Conversely, in cooling from gas-to-liquid and liquid-to-solid, heat is evolved to the environment. This heat that is absorbed or evolved in these phase transitions is called latent heat and it can occur over a very narrow range of temperature. The heat that is absorbed or evolved without a change of state is called sensible heat, and occurs over a wide range of temperature to supply significant thermal storage capacity. Over a limited range of temperature (e.g., 10° C.), the latent heat of the solid-to-liquid transition is 5–8 times greater than the sensible heat storage. The difference in thermal storage between latent and sensible heat is even larger in the liquid-to-gas transition.

However, some materials, because of crystallinity, strong intermolecular attraction (e.g., hydrogen bonding), and/or regularity of molecular structure, absorb and evolve much larger amounts of latent heat in going through these changes in physical state. The materials with very high latent thermal energy storage are commonly identified as "phase change materials (PCM)." As pointed out above, materials which undergo energetic phase transitions as a function of temperature can absorb and evolve large amounts of thermal energy in going through the changes of physical state. The liquid-to-gas transition is always much more energetic than the solid-to-liquid transition. However, the liquid-to-gas transition involves very large volume changes, and high pressures, that make these materials undesirable for many applications while uniquely qualifying them for others (e.g., steam turbines). The molecules that comprise phase change material may be either inorganic or organic. Of the inorganic phase change materials, water in its solid-to-liquid transition at 0° C., and liquid-to-gas at 100° C. is one of the most energetic and lowest cost for use at either of its phase change temperatures (0° and 100° C.).

For temperatures from just above 0° C. to 132° C., organic molecules comprised of linear crystalline alkyl hydrocarbons are the most useful and cost effective phase change materials. These linear crystalline alkyl hydrocarbon materials are low cost by-products of petroleum refining, and normally consist of a mixture of three or more carbon chain lengths that store and release about 35 calories/gram in melting and freezing. Ultra pure phase change materials are obtained by special synthesis, or extensive fractionation, have higher thermal energy storage of up to about 60 calories/gram. For example, 98% pure $C_{14}$ tetradecane has a thermal storage capacity of at least about 45 calories/gram, but these ultra pure phase change materials also cost several times as much as the less pure products from petroleum refining. Accordingly, because of the high cost, the ultra pure alkyl hydrocarbon phase change materials are only used in special applications which can afford the very high cost.

In order to safely transport and store temperature-sensitive materials, they must be maintained within a narrow temperature range. Medicinals such as vaccines, antibodies, etc., for example, must be maintained at temperatures above 0° C. and below 10° C., and preferably between +2 and +8° C. Phase change materials useful in the present invention include linear, crystalline alkyl hydrocarbons, or mixtures thereof, having an average carbon chain length of about 13 to 16 carbon atoms, as sold by Exxon under the trade name of Nor Par NP-15, or by Humphrey Chemical Company as technical or 98% pure tetradecane.

The combination of thermal energy storage and affordable cost stability to thermocycling, non-toxicity, commercial availability, etc., of the linear crystalline alkyl hydrocarbons from petroleum refining are not even approached on an overall basis by any other phase change material found in surveys of the published and patent literature. Desirable cost/performance properties of the linear crystalline alkyl hydrocarbon include:

High thermal energy storage (35–60 calories/gram);
Low-cost and available in large quantities;
Self-nucleating (no supercooling);
Stable to repeated thermocycling;
Non-toxic, not chemically reactive;
Non-hydrolyzable in an alkaline environment (e.g., concrete); and
Selectable melting temperatures from well below 0° C. to above 100° C.

Figure 2:
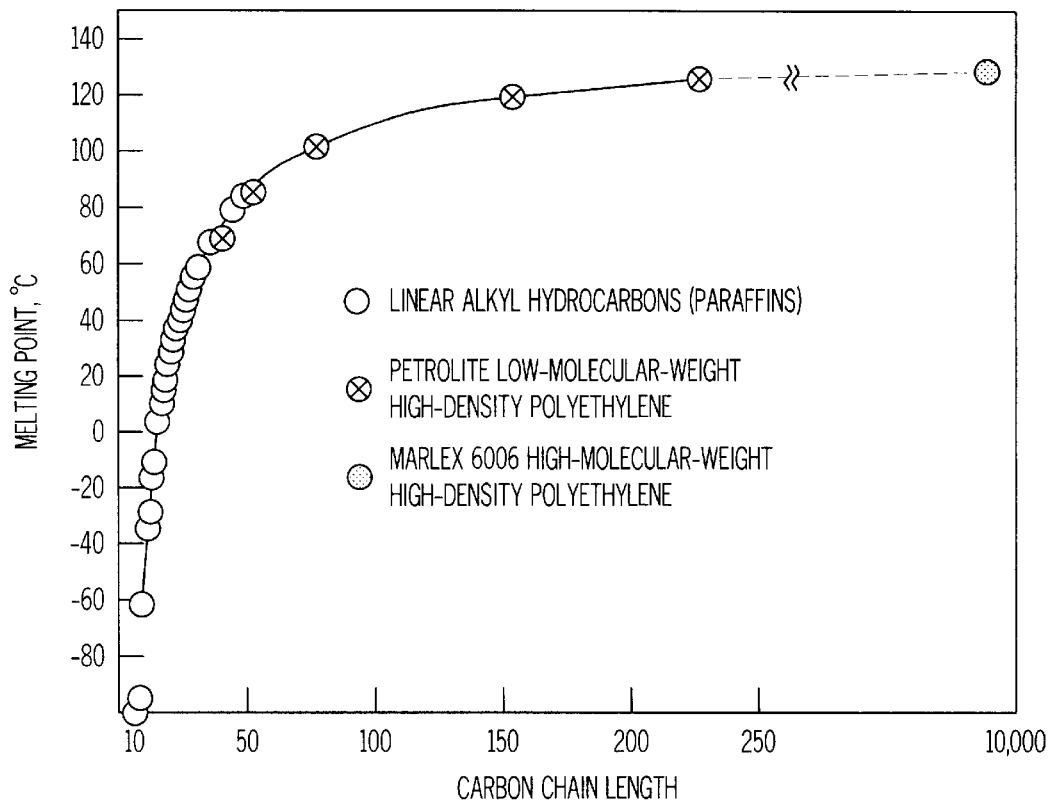
FIG. 2 is a graph showing melting temperature versus carbon chain length for commercially available phase change materials.

A graph of melting temperature versus carbon chain length for commercially available alkyl hydrocarbon phase change material is shown in FIG. 2 and illustrates the broad range of melting temperature available in these materials. This enables phase change materials to be selected that have the proper melting and freezing temperatures as needed for different applications.

The basic instrument used to guide research on phase change materials is the differential scanning calorimeter (DSC). This instrument imposes a controlled rate of heating and cooling on a small sample in a well-insulated test chamber, and compares the heat absorbed (endotherm) and emitted (exotherm) against a control. Using the DSC, one can accurately determine, independently of the surrounding environment, the important basic parameters of phase change material, including: the melting and freezing temperature; the range of temperature over which melting and freezing occurs; the rate dependence of melting and freezing; the degree of supercooling, if present; and a quantitative measure of the heat of fusion and crystallization.

The DSC tests can be run at rates of heating and cooling ranging from 100° C./minute to 0.1° C./minute, but a standard rate for phase change material screening tests is 2° C./minute. The DSC data is usually plotted as time versus heat flow of the sample, although plots of heat flow versus temperature can also be printed out by the DSC computer. The area of the endotherm and exotherm is integrated by the computer as Joules/gram. This value is converted to the more commonly used calories/gram by dividing by 4.185.

There are several problems associated with the direct use of 100% solid-to-liquid phase change material, including linear crystalline, alkyl hydrocarbon phase change materials. These problems are of such character and magnitude as to jeopardize or prevent successful use of the phase change material technology for most applications. These inherent problems include: large volume changes in melting and freezing, low viscosity in the liquid state and attendant problems of leakage, slow heat transfer rate, and adverse effects on the physical properties of the matrix. It has been found that the above problems can be eliminated or minimized if the phase change material is "contained," particularly in accordance with one of the following procedures:

(1) Containment of the 100% phase change material in "macrocapsules" or other liquid impervious enclosures such as pouches of plastic, metal or foil, or a container of glass or ceramic.
(2) Microencapsulation of phase change material in 25–250µ spheres, preferably having >90% phase change material core and <10% polymer shell.

(3) Imbibing phase change material into porous substrates at >60% by weight concentration.

(4) Permeation of phase change material into pellets of cross-linked high density polyethylene at 70% by weight.

(5) Dissolving phase change material at 60% by weight in thermoplastic compositions of phase change material/high density polyethylene/ethylene-vinyl acetate copolymer/silica, preferably at a ratio of about 60:16:8:16.

(6) Incorporating phase change material in dry powders of phase change material/silica, preferably at a ratio of about 65:35.

(7) Incorporating phase change material in gels of phase change material/silica, preferably at a ratio of about 76:24.

U.S. Pat. No. 5,106,520 to Salyer discloses a thermal energy storage material in the form of a dry powder formed from an alkyl hydrocarbon or water phase change material and silica particles. Because the phase change material/silica dry powders do not form a rigid solid, it is difficult to determine when the composition has reached a frozen state.

The phase change material/silica particle composition is particularly useful in the present invention in the form of a reversible gel which means that the composition may be repeatedly frozen and thawed. Preferably, the reversible gels are enclosed in a sealed, liquid-impervious polymeric, metallized polymeric, or metal foil enclosure to form a gel pack. Such compositions are described in detail in copending application Attorney Docket No. UVD 236 PA filed simultaneously herewith, the contents of which are incorporated herein by reference. The phase change material/silica particle composition useful in the present invention typically comprises about 70 to 90% by weight phase change material and about 10 to 30% by weight silica particles. Preferably, the phase change material/silica particle composition comprises about 77% by weight phase change material and about 23% by weight silica particles.

The phase change material/silica (about 77:23) gel has certain other advantages that cause it to be preferred for use as the phase change material in the present invention. For example: the gel will not readily leak out of the container, it contains a higher percentage of phase change material than the other methods of containment and thus has higher thermal energy storage capacity. It also has a high rate of heat transfer, and becomes hard when frozen at 5° C., and thus provides a ready indication of whether the phase change material is in the charged or discharged state.

The use of a hydrophobic silica is important in applications where the composition is exposed to water or high relative humidity as it prevents phase separation of the phase change material and the silica. A preferred hydrophobic silica has a density of about 2.2. Useful hydrophobic silica is available from PPG Industries of Pittsburgh, Pa. under the designation BXS-303. Surface treated hydrophobic formed silicas are also available from Cabot Corporation under the designations Cab-O-Sil® TS-610 and Cab-O-Sil® TS-720.

In applications where exposure to water is not a problem, lower cost hydrophilic silicas may be used. Suitable hydrophilic silicas include ABS precipitated silica from PPG and EH-5 fumed silica from Cabot.

The silicas used to form the gel can be the products made by thermal decomposition of organo silanes (Cabot fumed process); or the silicas made by precipitation from an alkaline solution of silica (precipitated silica, PPG). The precipitated silicas provide stable gels and are lower cost, and thus may be preferred. Either the fumed or precipitated silica can be surface treated with silane coupling agents, or silicone resins, to make them hydrophobic. The combination of the phase change material/hydrophobic silica is preferred because it will not phase separate when exposed to liquid water or very high relative humidity.

The phase change material preferred is the high purity products that are comprised of >90% of a single carbon chain length. Because of their higher purity, these phase change materials can store and release significantly higher amounts of thermal energy than the low cost products of petroleum refining sold by EXXON under their trade name of Nor Par NP-15. However, the lower cost of Nor Par NP-15 may cause it to be used for some specific applications.

A DSC graph of thermal storage of Nor Par NP-15 silica gel that melts and freezes near 5° C. is shown in FIG. 2 and the thermal energy storage data is tabulated in Table 1.

TABLE 1

| | | | DSC ANALYSIS | | | |
|---|---|---|---|---|---|---|
| Run No. | Tm (deg C.) | Tc (deg C.) | Tm-Tc (deg C.) | Heat of Fusion (J/g) | (Cal/g) | Heat of Recrys. (J/g) | (Cal/g) |
| 1 | -25.67 | -28.80 | 3.13 | 12.44 | 2.97 | 13.09 | 3.13 |
|   | 8.80 | 4.71 | 4.09 | 117.30 | 28.03 | 122.00 | 29.15 |
| 2 | -25.25 | -28.82 | 3.57 | 13.55 | 3.24 | 13.25 | 3.17 |
|   | 8.83 | 4.76 | 4.07 | 120.60 | 28.82 | 120.00 | 28.67 |
| Total | -25.46 | -28.81 | 3.35 | 13.00 | 3.11 | 13.17 | 3.15 |
|   | 8.82 | 4.74 | 4.08 | 118.95 | 28.42 | 121.00 | 28.91 |

For use in the invention as a source of electric power, solar photovoltaic power is preferred because of its simplicity and reliability. However, other sources of energy, such as those powered by fossil fuel; wind, e.g., windmills; and hydroenergy might be employed to advantage depending upon the location. Typical photovoltaic modules are sold by Solarex, Frederick, Md.; Uni-solar, Troy, Mich.; BP International; and Siemens. Where AC power is available, it can be used in lieu of the solar photovoltaic or other DC power sources in the system.

Several types of storage batteries can be used in the invention. Because of its ready availability and low cost, a deep cycle 12 volt lead-acid storage battery is preferred for the present system. However, higher cost alkaline batteries have advantage of longer life and thus might also be used in some cases.

A novel swing motor vapor compression unit is preferred as the refrigeration unit in the present invention. However, conventional piston, vane, or scroll compressors could be substituted in some applications. The swing motor, developed by the Sawafuji Electric Company and described in U.S. Pat. Nos. 4,632,645 and 4,706,470, the contents of which are incorporated herein by reference to the extent necessary to describe their refrigeration unit, is an electrodynamic reciprocating device that directly drives the piston of a compressor. It offers advantages such as great economy, compact size and low weight, high efficiency (due to its resonating design), and low friction losses that cumulatively result in minimum power consumption.

The closable container or housing of the self-sustaining refrigeration and transport system of the present invention is manufactured using double wall plastic insulated vacuum panels which have a space between the panel sheets which minimizes heat transfer through the panels and which provide good gas and liquid barrier properties. Such panels are typically manufactured from polymeric materials. Most polymeric materials capable of providing the necessary structural stability exhibit either good gas barrier properties or good liquid barrier properties, but not both. Therefore, polymer composites are most effective in reducing permeation of both gas and liquids. The composite may be prepared from multiple sheets of polymers in which at least one of the polymer sheets exhibits good gas barrier properties and another of the polymer sheets exhibits good liquid barrier properties.

A list of polymeric materials useful in constructing the vacuum panels with their permeability properties is shown in Table 2.

TABLE 2

| Polymer | Polymer Class | Permeation Rates | | |
|---|---|---|---|---|
| | | Oxygen[1] | $CO_2$[1] | Water[2] |
| Polyvinylidene chloride | Halogen | 0.1 | 0.3 | 0.2 |
| LOPAC[3] | Nitrile | 0.6 | 1.8 | 2.9 |
| BAREX[4] | Nitrile | 1.1 | 3.1 | 6.1 |
| Saran[5] wrap | Halogen | 1.3 | 4.5 | 0.5 |
| Epoxy | Thermoset | 3.0 | 9.0 | 4.0 |
| KEL F (PCTFE) | Halogen | 3.2 | 12.0 | 0.3 |
| TROGAMID T[6] | Polyamide | 4.5 | 12.0 | 5.2 |
| KYNAR PVDF[7] | Halogen | 4.5 | 15.0 | 1.0 |
| MYLAR[8] | Polyester | 3–10 | 9–35 | 2–4 |
| Nylon 69 - Nylon 610 | Polyamide | 5.7 | 12.0 | 6.0 |
| Phenoxy | Condensate | 7.0 | 15.0 | 4.5 |
| PVC (rigid) | Halogen | 8–15 | 20–40 | 2–3 |
| Nylon 6 - Nylon 66 | Polyamide | 5.0 | 9.0 | 18.0 |
| DELRIN[9] | Polyacetal | 12.0 | 29.0 | 13.0 |
| Polymethyl Methacrylate | Acrylic | 17.0 | 40.0 | 12.0 |
| Nylon 11 | Polyamide | 26.0 | 64.0 | 4.6 |
| XT Polymer[10] | Acrylic | 20–40 | 60–120 | 10–15 |
| Polyvinyl Alcohol (dry) | Hydroxyl | 0.01 | 0.03 | 2,000 |
| Cellophane (dry-uncoated) | Cellulosic | 0.13 | 0.3 | 365 |
| High Density Polyethylene | Olefin | 110 | 300 | 0.5 |
| Polypropylene | Olefin | 150 | 450 | 0.5 |
| Teflon | Halogen | 220 | 600 | 0.25 |
| Polybutene | Olefin | 330 | 1,000 | 1.5 |
| Low Density Polyethylene | Olefin | 480 | 1,500 | 1.5 |
| Surlyn[11] | Ionomer | 550 | 2,000 | 2.7 |
| Butyl Rubber | Elastomer | 1,500 | >4,000 | 2.1 |

[1]CC/24 hours/100 sq. in/mil - atmos. and 73° F. (0% RH)
[2]gm/24 hours/100 sq. in/mil - 100° F. (100% RH)
[3]A thermoplastic acrylonitrile copolymer sold by Monsanto
[4]A thermoplastic acrylonitrile copolymer sold by BP Chemical
[5]A plasticized thermoplastic polyvinylidene chloride film sold by DOW Chemicals Co.
[6]A clear nylon copolymer sold by HULS America
[7]A polyvinylidene fluoride sold by ELF ATO-CHEM, North America
[8]A polyethylene terephthalate polymer sold by DuPont
[9]A thermoplastic acetal resin sold by DuPont
[10]An acrylic polymer sold by CYRO Industries
[11]A thermoplastic polyethylene/acrylic acid copolymer sold by DuPont Another means of providing good overall gas and liquid barrier properties is to adhere a barrier type film to the inner surface of at least one of the double wall vacuum panels. For example, a thin film of Saran wrap which has good water barrier properties may be adhered to the inner surface of BAREX®, a nitrile polymer manufactured by BP Chemical, which has good gas barrier properties. Satisfactory barrier results may also be obtained by coating a polymer sheet with aluminum foil or by vacuum sputtering aluminum or other effective metal onto the surface of a polymer sheet.

The double wall plastic vacuum panel insulation which comprises at least two panel sheets having a space under vacuum between the sheets typically uses a support material such as compressed silica particles to support atmospheric pressure on the double wall panels. The free space between the particles is divided into small pockets which minimize convection heat transfer and permit high R values of >20, preferably, greater than about 25, to be obtained in 1 inch panels at pressure at about 1–3 torr. A typical silica is a precipitated silica sold under the trade name FK 500LS by North American Silica Co., Valley Forge, Pa.

Other methods of support and space subdivision that may be employed include: foams of appropriate density and small cell size; compressed organic fibers such as cotton, wool, polyester, nylon, etc; and special open cell urethane precipitation foams comprised of small monodisperse spheres. A preferred vacuum support is a low density foam material, particularly an open cell foam. A low density material having a honeycomb configuration, preferably with the open pore space filled with a low density small cell size foam such as a phenol/formaldehyde or polyurethane foam, particles of silica or polymer, or a finely divided precipitation foam, etc., is particularly useful as a support. The open cell foams include Dow Chemical Company's compressed polystyrene foam of about 4 lbs/ft$^3$ density, or the ICI polyurethane small cell size open cell foam having a density of about 3½ lbs/ft$^3$.

Additionally, it is advantageous to include inside the filled/evacuated panels a getter for air and moisture, such as molecular sieves having a pore size of about 4 Å, to improve the R value and increase the life of the vacuum insulation. Molecular sieves of this and other pore sizes are sold by Linde Division of Union Carbide.

In the case of the present evacuated double wall plastic panel insulation with plastic barrier material, evacuation of the space between the walls of the panel through an evacuation tube is desirable. The use of the evacuation tube of this invention eliminates the need for a vacuum chamber, which is both expensive and time consuming to use. To use the evacuation tube in a preferred fashion, three things are required:

(1) A method to attach an evacuation tube to the panel;
(2) A panel filler provided with air paths to the evacuation tube; and
(3) A method for sealing the tube after evacuation.

In the preferred method, where the barrier material is a tray and seal sheet made of, e.g., Barex® plastic, one end of a length of Barex® tubing is heated and rotated until it softens and the end flares open to resemble a funnel. The tube, still soft at the end, is inserted into a close fitting hole bored perpendicularly into the face of a block of hardwood. The softened flare is then pressed against a flat surface with the block so it is flattened out into a washer-like skirt surrounding the end of the tube. It is this skirt which is sealed to the panel by one of two methods:

(1) In the first method, the tubing is set in the block used to form the flat skirt, and said block is set into the tray-forming mold and is so sized and shaped as to form a portion of the tray mold. After the tray is vacuum formed, the skirt and tube are held in their final position on the finished tray by the block. The skirt and the portion of the tray wall which overlays it are both softened and then heated locally with a hot air plastic welder or a hydrogen-oxygen flame. After the skirt and the overlaying portion of the tray wall are softened, a ram is driven against this material to force the skirt and overlay together intimately between the block and ram, thereby creating a weld between the two.

(2) In the second method, the tubing is dropped into a close fitting hole in a piece of brass or other metal tubing having a wall thickness on the order of ⅛–¼ of an inch and extending beyond the length of the Barex® tube by some minimal amount. This is set in a radio frequency welding apparatus so the metal tube becomes one electrode of the apparatus. An opposing electrode which covers the area of the first electrode is brought into place, usually by pneumatic pressure cylinders. An appropriately powerful radio frequency field is applied to the electrodes from a power oscillator in the apparatus and for such duration as is required to soften the tubing skirt and overlaying tray wall material. At this point the same pressure which brought the electrodes into place squeezes the Barex® sufficiently to form a weld between the two softened pieces.

After either welding method is applied, either a drill or punch is used to cut out the overlaying tray wall plastic where it covers the end of the tube, thus allowing the tube to open through the wall of the tray.

Next, a filler material, such as an essentially 100% open cell foam, is shaped to place in the tray. On its surface air channels are formed. In the preferred embodiment, a piece of coarse mesh is impressed into the filler material surface on all major sides, then removed, leaving a latticework of fine channels behind through which air may come out the surface of the material and find its way to the evacuation tube. Without these channels, evacuation time is lengthened considerably.

Finally, the panel is evacuated by attaching a hose from a vacuum pump inlet to the open end of the Barex® tube. When the panel is sufficiently evacuated, the exposed portions of the tube near the panel surface are carefully softened with a hot air welder or a hydrogen-oxygen flame until they begin to collapse inward under air pressure. At this point, the sides of the softened material are squeezed with the jaws of a crushing tool, such as a pair of pliers, to force the inner walls of the tube into intimate contact, and thereby form a weld between them and effectively sealing off the inside of the panel from outside air filtration. The evacuation hose may next be removed, and any excess tubing material at the outside end of the sealed tube may be cut away with wire cutters or a similar tool before the Barex® cools and hardens.

In a second method, the evacuation tube is formed from the plastic barrier film tray material as an integral part of the tray design. This takes specialized molds and molding equipment as it represents a very deep draw of the material. Thus formed, the closed end of the evacuation tube is cut or drilled open, and evacuation and sealing take place as in the last paragraph.

In a third method, a Barex® tray is not used to form the basis of the panel, but rather an envelope of plastic barrier film is used. The filler material is formed as before and serves to determine the shape of the finished evacuated insulation panel (rather than a rigid tray) after the sealed barrier film envelope is pressed in around it by air pressure against the vacuum inside.

The vacuum in the barrier film envelope is created by forming the envelope around the filler so as to leave a tube sized channel to the outside. A device consisting of bellows or "O" ring sealed telescoping rigid tubes is inserted into the channel and an airtight seal is achieved by drawing "O" rings or a special clamp around the outside of the channel and holding it firmly against the outer telescoping tube. The outer tube does not extend into the area of the final seal to be made on the barrier film envelope, but falls short of that by a distance sufficient to allow a seal to be made when the inner tube is withdrawn. The inner telescoping tube is placed against the filler material to prevent it becoming clogged by collapsing barrier film, and the inside of the panel is then evacuated through this tube. When the vacuum is satisfactory, the inner tube, whose end is specially shaped to avoid allowing wrinkles in the barrier film to form in its wake as it withdraws, is then pulled back far enough to clear the site of the final closing seal. The seal is then made by conventional bar sealing technique so as to overlap the original envelope perimeter seals, thus closing off the air path into the envelope and leaving no sealing tube behind.

In a fourth method, a barrier film is used, but a skirted tube of compatible material is attached to the film envelope as it was to the Barex® tray, and is evacuated and sealed as it was in the description of evacuating and sealing a Barex® barrier evacuated insulation panel.

Having described preferred embodiments of the invention, it will be obvious to those skilled in the art that many variations on one or more of the six individual components are possible without losing the advantages of the scope of our invention as defined in the appended claims.

What is claimed is:

1. A portable, self-sustaining refrigeration system for storing and transporting temperature-sensitive materials, said system comprising:
    an insulated refrigeration housing constructed of double wall plastic panels having an R value per inch of at least 20; and
    a thermal storage phase change material for operation at about 0° to 10° .C and having a thermal storage capacity of at least 20 calories/gram wherein said phase change material is a $C_{13}$–$C_{16}$ linear crystalline alkyl hydrocarbon.

2. The system of claim 1 wherein said system additionally includes a source of energy which is powered by solar, fossil fuel, wind or hydroenergy.

3. The system of claim 2 wherein said source of energy is a generator powered by solar energy.

4. The system of claim 3 wherein said solar energy is provided by a solar photovoltaic power source.

5. The system of claim 1 wherein said system additionally includes a storage battery.

6. The system of claim 5 wherein said battery is a lead-acid battery.

7. The system of claim 6 wherein said battery is a 12 volt deep cycle battery.

8. The system of claim 1 wherein said system additionally includes a refrigeration unit comprising a vapor compressor in a closable housing which provides a low rate of heat transfer.

9. The system of claim 8 wherein said vapor compressor is driven by a direct drive electro-dynamic reciprocating motor.

10. The system of claim 9 wherein said compressor uses a compressible vapor component as refrigerant.

11. The system of claim 1 wherein said phase change material has a phase change temperature of about 5° C.

12. The system of claim 1 wherein said double wall plastic panels have an R value per inch greater than 25.

13. The system of claim 12 wherein said double wall panels comprise a space between said panels, wherein said space is evacuated to a pressure of about 1–3 torr or less.

14. The system of claim 1 wherein said panels are provided with an evacuation tube.

15. The system of claim 14 wherein said evacuation tube is a heat sealable polymeric tube.

16. The system of claim 13 wherein said double wall plastic panels include a mechanical support selected from the group consisting of close-packed silica particles, compressed organic fibers, open cell foam, precipitated foam, and low density honeycomb structure.

17. The system of claim 16 further comprising a getter for absorbing gas and water vapor.

18. The system of claim 17 wherein said getter comprises a molecular sieve having an average pore size of about 4 Å.

19. The system of claim 16 wherein said mechanical support is an open cell foam or a honeycomb structure.

20. The system of claim 19 wherein said mechanical support is an open cell foam.

21. The system of claim 1 wherein said phase change material comprises a high purity $C_{14}$ linear crystalline alkyl hydrocarbon having a thermal energy storage capacity of at least about 45 calories/gram.

22. The system of claim 1 wherein said phase change material is contained in a silica substrate, said phase change material-containing silica substrate being enclosed in a sealed, liquid impervious polymeric, metalized polymeric, or metal foil enclosure.

23. The system of claim 22 wherein said phase change material-containing silica substrate is in the form of a phase change material/silica reversible gel or a phase change material/silica dry powder.

24. The system of claim 23 wherein said phase change material-containing silica substrate is in the form of a reversible gel having a thermal energy storage capacity of about 35 to 60 calories/gram, said reversible gel comprising about 70 to 90% by weight phase change material and about 10 to 30% by weight silica substrate.

25. The system of claim 22, wherein said silica is a hydrophobic silica having a density of about 2.2.

26. A portable, self-sustaining refrigeration system for storing and transporting temperature-sensitive materials, said system comprising:
   a solar photovoltaic source for generating electrical energy;
   a 12-volt, lead-acid battery for storing said electrical energy;
   a low-power vapor compressor refrigeration unit which employs a vapor compressible component;
   an insulated refrigeration housing having double wall plastic vacuum panels containing an open cell foam or honeycomb structure to support atmospheric pressure on the panels to a pressure of about 1–3 torr or less, said panels having an R value per inch of at least 20;
   a $C_{13}$–$C_{16}$ linear crystalline alkyl hydrocarbon phase change material in the form of a reversible gel having a phase change temperature of about 5° C. and a thermal energy storage capacity of about at least 35 calories/gram, said reversible gel comprising about 70 to 90% by weight of said phase change material and about 10 to 30% by weight of silica wherein said reversible gel is enclosed in a sealed liquid impervious polymeric or metal foil enclosure to form a gel pack;
   an insulated portable container for holding said temperature sensitive materials and said reversible gel; and
   A molecular sieve having an average pore size of about 4 Å.

27. The system of claim 26 wherein said phase change material is a high purity $C_{14}$ linear crystalline alkyl hydrocarbon of about 98% purity, said high purity $C_{14}$ linear crystalline alkyl hydrocarbon having a thermal storage capacity of at least about 45 calories/gram.

28. The system of claim 26 wherein said double wall plastic vacuum panel insulation is provided with a heat sealable, polymeric evacuation tube.

29. The system of claim 24 wherein said reversible gel comprises about 77% by weight phase change material and about 23% by weight silica.

30. The system of claim 26 wherein said reversible gel comprises about 77% by weight phase change material and about 23% by weight silica.

31. The system of claim 22 wherein said system further comprises an insulated portable container for holding said temperature sensitive material and said reversible gel.

* * * * *